Figure 1:
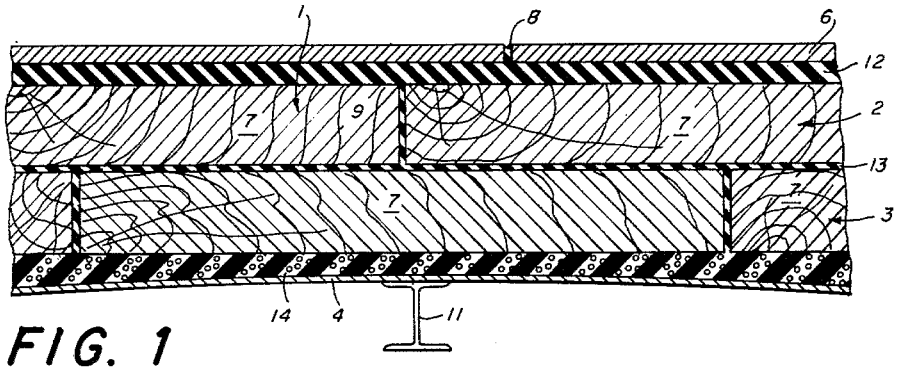

Jan. 18, 1966  W. H. MILES  3,229,433
STRUCTURAL SANDWICH PANEL DECK
Filed Aug. 28, 1962

INVENTOR.
WILLIAM H. MILES
BY
ATTORNEYS

United States Patent Office 3,229,433
Patented Jan. 18, 1966

1

3,229,433
STRUCTURAL SANDWICH PANEL DECK
William H. Miles, Tracyton, Wash., assignor to the United
States of America as represented by the Secretary of
the Navy
Filed Aug. 28, 1962, Ser. No. 220,097
6 Claims. (Cl. 52—309)
(Granted under Title 35, U.S. Code (1952), sec. 266)

The invention described herein may be manufactured and used by or for the Government of the United States of America for governmental purposes without the payment of any royalties thereon or therefor.

The present invention relates to metal-faced plywood panelling and, in particular, the invention features the use of such a paneling as a durable, impact-resistant floor or deck surface, such, for example, as the flight deck surface of an aircraft carrier.

Metal and wood composites have been rather widely used for a variety of purposes such, for example, as the wall facings for airplane cabins or decorative and somewhat functional facings or claddings for furniture and the like. These uses, of course, are radically different from any utilization of similar composite materials as an impact-resistant floor or deck surface.

As already indicated, the present invention particularly contemplates using a metal-wood composite as an aircraft carrier flight deck which, of course, is subjected to extremes of impact, as well as other debilating forces such as friction, heat, moisture, as well as the ability to accept heavy rolling loads and impacts without deflection and breakage. This latter consideration is quite important in flight deck construction to the extent that any such decking must provide adequate load distribution so as to avoid any deflection or breakage in areas where the impacts are concentrated.

Other problems, particularly in flight deck construction, involve weight, strength and economic considerations. For example, design considerations constantly involve a compromise between strength and weight, the optimum being to provide a light weight strong decking of low initial, replacement and maintenance cost, and having sufficient strength to accommodate modern jet aircraft with their high speed landings and take-offs. In the past, it has been customary to form such decks of narrow teakwood planking, although such planking presented a number of difficulties including relatively poor abrasion resistance, a water absorption capability and excessive maintenance and replacement costs. More modern aircraft carriers utilize metal flight decks which are a distinct improvement but which, as it is known to those familiar with such construction, must be specially designed and built. In other words, it is not feasible to replace the older teakwood decks with the all metal construction.

It is therefore an object of the present invention to provide a strong, durable, impact-resistant composite laminate floor or deck surface particularly suited for use as a flight deck for aircraft carriers.

A more specific object is to provide a composite laminate having substantial impact resistance provided by a metal facing, the laminate being an adhesively bonded structure formed of separate wood and metal courses with no need for through joints or other mechanical fastenings.

A further object is to provide an integrally-bonded, metal-faced sandwich construction formed of relatively

2 large panels capable of receiving and adequately distributing loads and impacts.

An object related in part to the last-mentioned object is to provide a suitable bond for the metal and wood of the laminate to the extent that substantial elongations and contractions of the metal panels when subjected to temperature variations is fully accommodated without rupture by the bonding material.

A further object which will become more apparent is to provide such a composite integrally bonded metal faced construction for flight decks and the like, the construction permitting the lay-up of the materials in situ over the flight deck surface.

A further object related to the last object is to permit such a lay-up without the need for high temperature or pressure cures for the bonding materials.

A more generalized object is to provide a suitable metal faced sandwich construction adapted to be substituted for teakwood flight decks to the extent that the composite can be directly applied to existing teakwood flight sub-surfaces.

Other objects and their attendant advantages will become more apparent in the ensuing description.

According to the invention the laminate structure is formed of a plywood core the bottom surface of which is bonded to the deck's sub-surface or to other available supporting structure, while the top or upper surface is bonded in a special manner to a metal facing which provides the exterior impact resistant surface. The plywood core has multiple courses each bonded one to the other by a suitable thin layer of adhesive and these courses each are formed of panels of substantial individual size, such for example as 4' x 10' hickory or Douglas fir plywood panels of a thickness of about 1". Also, the invention features a staggered lay-up of the super-imposed courses of the panels and most, most suitably, the panels of an upper layer are staggered one-half the width and length of an underlying course or layer to provide core continuity. Similarly, the metal facing for the plywood core also is formed of panels preferably of aluminum or steel, these metal panels having dimensions at least as large as the plywood panels and having a substantial thickness of at least ⅛". In the preferred form, the metal panels are hooked around the ends of underlying plywood panels to achieve a mechanically interconnected arrangement insuring that the edges cannot be caught by aircraft tailhooks or the like and further insuring a firm inter-engagement in the event adhesive bonding should fail at these edges. This hooking or locking arrangement of the metal facing will be described in further detail.

To provide an integral structure, all of the courses including the metal over-lay are adhesively bonded one to the other and the laminate also is adhesively bonded to its sub-structure or supporting surface. Most suitably, the bonding to the sub-structure is provided by a special adhesive in the form of a liquid synthetic rubber into which is mixed, preferably in equal parts, a quantity of phenolic microspheres which provide bulk to fill gaps usually found in deck sub-structures. Also, it is preferred to use a curable liquid synthetic rubber mastic for bonding the plywood layers and a similar mastic is used between the metal facing and the upper surface of the laminated plywood core.

An important feature of the invention lies in the fact that the rubber-like adhesive between the metal and the plywood is formed of sufficient thickness to flexibly accommodate lateral and longitudinal expansion and contraction of the metal panels. The entire arrangement provides adequate and durable strength and impact resistance due particularly to the panel construction both of the staggered plywood courses and the metal overlay or facing. Also, the integral bonding provides a secure structure with adequate watertight integrity and the security of the structure is substantially augmented by the use of the rubber-like mastic to provide a flexible bonding action between the metal and the plywood capable of accommodating thermal expansions. In this regard, it may be interesting to note that the relatively large panel construction permits a distribution of impact and rolling forces over a relatively wide area. By the same token, however, the use of large metal panels or plates of sufficient thickness to withstand impact presents a thermal expansion and contraction problem which is met by the employment of the flexible adhesive, although it is considered advisable to limit the length of the metal panels sufficiently to minimize expansion and contraction and thereby permit a reasonable thickness of mastic to be used between the metal and the plywood. Other features and advantages of the arrangement will become more apparent and the detailed description which is to follow.

Figure 2:
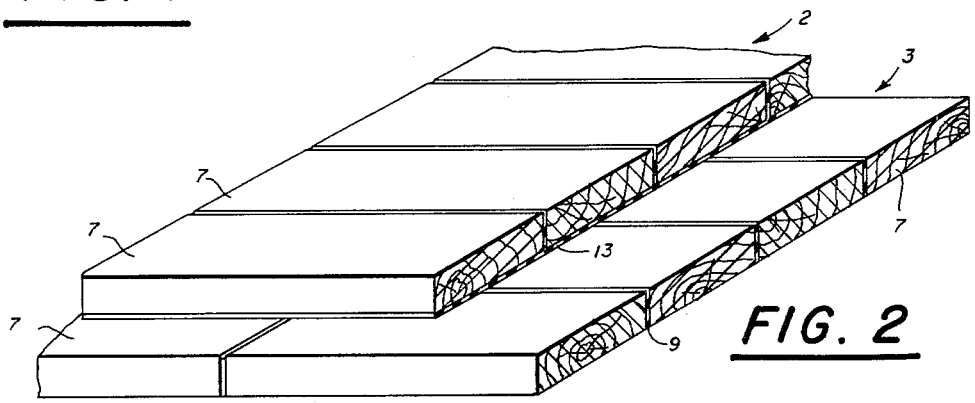
Figure 3:
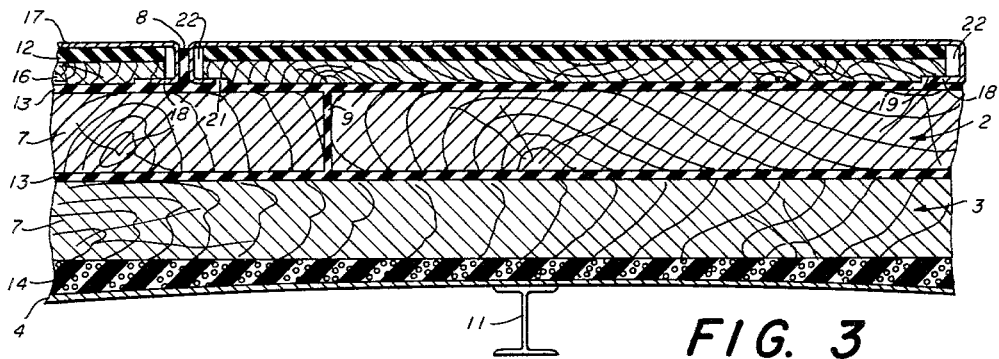
Figure 4:
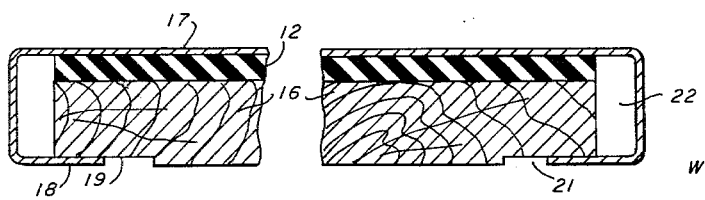

The preferred embodiment of the invention is illustrated in the accompanying drawings of which FIG. 1 is a vertical section illustrating one embodiment of the composite laminate supported by and bonded to conventional steel pan flight deck sub-structure; FIG. 2 is a perspective in plan illustrating a staggered arrangement of the courses making up the plywood core of the composite laminate; FIG. 3 is a view similar to FIG. 1 illustrating another embodiment of the invention, and FIG. 4 is a longitudinal vertical section through one panel of the FIG. 3 embodiment, this view illustrating particularly the manner in which the metal panel is locked to a wood panel to form a top course of the composite laminate.

Referring to the drawings and, in particular, to the embodiment illustrated in FIG. 1, it will be seen that the composite laminate as a unit is formed of a plywood core 1 made up of super-imposed courses 2 and 3, this core in turn being supported by and adhesively bonded to a flight deck sub-structure such as steel pan 4. Finally, the laminate is completed by adhesively bonding a metal facing 6 to top course 2 of the plywood core.

In greater particular, plywood core 1 is formed in the manner best shown in FIG. 2 of two courses of plywood panels 7 which, preferably, are formed of Douglas fir, although other core materials such as high strength, lightweight, impregnated hardboards may be substituted as considered desirable. Each of the panels is of substantial size, the panels used in actual construction of the deck being ¼" x 4' x 10'. As far as dimensional considerations of the plywood panels are concerned, the important factor is to utilize panels of substantial size so that weight or impact loads can be distributed over a relatively wide area. The size of the wood panels also will be dependent to some extent on considerations affecting the metal facing. The staggered arrangement illustrated in FIG. 2 is particularly important not only to provide core continuity with no through seams but also to increase the stiffness or rigidity of the core and permit greater impact resistance and load distribution. As shown, the two courses of the core preferably are staggered one half the width and length of the panels.

Metal facing 6 also is formed of individual panels laid end to end and, as seen in FIG. 1, the ends of these panels are spaced one from the other approximately ⅛" to provide an expansion gap 8 which, as shown, are spaced from seams 9 of the wood panels to eliminate through seams. In the actual construction or lay-up of the composite on a flight deck, it will be found that flight decks customarily include tie-down fittings, studs and other similar protrusions so that the panels usually will have to be patterned to clear such objects.

The laminate structure as a whole is supported by the steel subdeck of the carrier, this deck usually being in the illustrated form having its steel pan 4 supported at intervals by I-beams 11. It is particularly pertinent to note that the stretches of the pan between the I-beams sag somewhat so that there are substantial thickness variations between the bottom of the plywood core and the steel pan.

Another feature of the invention is that it is an integrally bonded sandwich construction without through joints, the bond being formed preferably by particular flexible adhesives which will be described. The most important adhesive bond of the composite is that between metal facing 6 and plywood panels 7 of the top course of the plywood core, the significance of this bond being readily recognizable from the obvious fact that the thermal conductivity and coefficient of expansion of the metal, particularly aluminum, vary considerably from that of plywood. Obviously, upon expansion of the metal panels, rigid bonding material or adhesives soon would rupture and break loose, especially when the panels are of a substantial length sufficient to distribute the anticipated loads and heavy impacts of the landing and take-off of modern aircraft.

Before describing the adhesive, it also is important to note that the panels of metal facing 6 are of substantial thickness as opposed to the thin sheets of aluminum or foils of other metals frequently used as facings for plywood when the combination or composite lamination is to provide wall coverings or decorative facings, nine specifically, metal panels 1, if formed of aluminum, should be approximately ¼", or, if formed of steel or of other stiffer metal, the thickness obviously can be reduced. However, the thickness regardless of the metal material employed for the facing must be sufficient not only to withstand anticipated impacts but also to avoid buckling such as had been found to occur when thin aluminum sheet is employed.

As already indicated, one of the important manners in which the present invention accommodates thermal expansion and contraction as well as avoids buckling of the metal facing is by the use of a flexible adhesive which is provided in a relatively thick layer 12 between metal facing 6 and the plywood panels of top plywood course 2. An elastomeric adhesive is considered essential and this adhesive may be selected from commercially available elastomeric water, oil and ozone resistant mastic, gap-filling adhesives such as polysulfide, neoprene or polyurethane based compounds. As may be noted, these materials are liquid synthetic rubbers. A further essential restriction upon the selection of adhesive involves, of course, its capability of retaining adhesion in the presence of extreme differential expansion. For instance, a 12' long aluminum sheet, such as is preferred in the FIG. 1 embodiment, can be bonded to the upper course of the plywood panels with a polysulfide having an average thickness of ⁵⁄₆₄", it having been found that such a thickness can accommodate expansion and contraction without bond failure when subjected to 100° F. temperature variations. In other words, such a thickness accommodates temperature variations of 100° F. on either side of anticipated ambient temperatures. The end movement of such an aluminum sheet approximates ³⁄₁₆" and, of course, it is for this reason that expansion gaps 8 are left between the ends of the metal panels.

The polysulfide elastomer preferred in the present laminate is compounded by several suppliers and it consists of liquid polysulfide together with compounding ingredients which are well known in the art as appropriate mechanisms for reinforcing, stabilizing, and controlling viscosity of flow. The liquid polysulfide component is a reaction product of organic dihalides and sodium polysulfide, slightly depolymerized to render it liquid. For example, the liquid polysulfide may be a reaction product of dichloroethyl formal (98% mole), trichloropropane (2% mole) and sodium polysulfide in amounts proper for reaction. This liquid polysulfide is known as Thiokol LP-2, LP-3, LP-32 or LP-33 depending upon the degree of reaction or viscosity as produced by the Thiokol Corporation. These particular polymers are described in Zimmerman and Lavine's Handbook of Material Tradenames, Supplement I, published in 1956. Thiokol is a trademark for various products produced by the Thiokol Corporation including the above-identified types, these compounds being polymers which, as is well known in the art, can be converted in place at room temperature to tough rubbers without appreciable shrinkage. The compounds also are resistant to solvents, oils and greases and they have good aging characteristics and maintain rubber-like properties over a wide range. Typical formulations of the polysulfide compound suitable for use with a hardener for curing into a solid flexible elastomer at room temperature are:

| | P.b.w. |
|---|---|
| Thiokol (LP-2, LP-3, LP-32, LP-33) | 100 |
| Stearic acid | .5-1 |
| Pigment (carbon black, zinc, sulfide, titanium dioxide | 30-80 |

An accelerator or hardener for this liquid may be as follows:

| | P.b.w. |
|---|---|
| Lead peroxide | 4.5 |
| Stearic acid | .5-1 |
| Dibutyl phthalate | 6.0-7.0 |

For improved adhesion, the following mixture may be added to the accelerator:

| | P.b.w. |
|---|---|
| Phenolic resin | 5-15 |
| Polyvinyl alcohol | 1-2 |

Alternate accelerators include hexamethylene-triamene or cumene hydroperoxide. Other types of hardeners offering improved possibilities are P-quinone dioxime or P-dinitrobenzene, these preferably, being used with LP-3 or LP-33 but without a need for stearic acid or dibutyl phthalate.

Typical reactions of the compounded organic polysulfide (R) are as follows:

$$2-(R)SH+PbO_2 \rightarrow (R)-SS-(R)+H_2O+PbO$$

or $2-(R)SH+ZNO \rightarrow (R)-S-ZN-S(R)+H_2O$. As may be noted, these products are essentially 100% reactive so that the converted compounds demonstrate no appreciable shrinkage with the result that the bond between the metal and the plywood is evenly distributed in its overall strength.

As to the bonding together of the plywood layers as well as the bottom face of the plywood core to steel pan 4, the adhesives employed for this purpose may be the same as those previously described, although the use of flexible adhesives for these latter purposes is not too critical since the thermal expansion and contraction problem exists only to minor extents. However, such elastomeric adhesives are preferred principally because of their low shrinkage, their resistance to solvents, oils, greases etc. and their flexibility to accommodate whatever sheer forces may be imposed upon them. As will be noted in FIG. 1, a thin film 13 of adhesive is employed between the courses of plywood panels 2 and 3, while a thick layer 14 of adhesive fills the space between the bottom surface of the plywood core and the steel pan.

This latter layer 14 is a specially-formulated adhesive to the extent that, preferably, it is formed of a mixture of equal parts of the previously-described elastomeric adhesive and a microsphere filler. The filler, more specifically, is a batch of hollow spheres of approximately 2-7 microns, these spheres usually being filled with an inert gas and being employed as a bulking agent which substantially reduces the cost of the adhesive and also provides a strong integral bonding of the panel core to the steel pan. Bonding eliminates any need for numerous fastening studs such as commonly were used in prior teakwood planking. The particular microspheres employed are known as BJO-0930 phenolic microballoons, the term microballoons being a tradename applied to microspheres produced by Bakelite Corporation.

The lay-up of the composite laminate shown in FIG. 1 is accomplished in a particular manner on location or, in carrier work, on the deck. In commencing the lay-up, the panels first are patterned, then spray-coated on all surfaces with a specified primer which is a matter of choice depending upon the particular elastomeric adhesive or other adhesives to be employed. Such primers usually are recommended by the commercial producer of the elastomer. First course 3 of the plywood core then is bonded to the steel sub-deck with the leveling, gap-filling polysulfide mastic-microsphere mixture already described. First, the steel deck should be cleaned with a suitable rust preventative compound and then the leveling coat troweled down and leveled, this layer usually averaging ¼″ in thickness with a minimum of 1/16″ over the longitudinals or I-beams. The bottom and edges of first course 3 also are coated with the same mixture preferably using a ⅛″ x ⅛″ notched trowel and, after installation, the panels are well tamped to eliminate air pockets, following which they may be weighted with steel pigs and sandbags to an average of approximately 10 lbs. per square foot and left overnight.

Next, the top face of the first course and bottom face of the second course of the primed plywood are coated by troweling a 1/16″ thick layer over each and, again, this layer after installation, is tamped, weighted and permitted to cure. In all of these operations, it will be recognized that the mixing of the liquid synthetic rubber with the accelerator can be done on location and these compounds usually have a working life of 2 to 4 hours at ambient temperatures so that batches can be easily spread and individual panels laid up within the working time limits. Solvent for such cleaning as may be necessary can be equal parts of toluene and methyl ethyl ketone (MEK) and it will be found advisable to use rubber gloves during mixing, handling and spreading.

Prior to applying the metal panel overlay, the top of the second course should be surface-planed, to eliminate unevenness at joints, and then prime coated. Also, the back surfaces of the metal overlay (steel or aluminum) should be prepared for bonding by drum sanding or similar expedient, the prepared surfaces of both the metal and the wood being coated by troweling or otherwise applying the relatively thick polysulfide or other elastomeric adhesive. To insure expansion gaps washers temporarily may be inserted along the edges of abutting metal panels and the installed steel or aluminum overlay then is sandbagged and permitted to cure for a period of about twenty-four hours. The unfilled joints between the panels are filled flush with the same adhesive employed for the bond.

Trial installations of a composite laminate corresponding to that previously described have been made and evaluated under rigorous flight deck conditions and for a lengthy trial period with excellent results. Thus, in spite of temperature variations 100° F. on either side of ambient, as well as extreme impacts and debilitating forces to which the composite was subjected, bonding retained its continuity and the metal overlay maintained its smooth, unbuckled and unwavy characteristics. Also, the composite has excellent watertight integrity and adequately resists other chemical deterioration. These factors, coupled with the relative ease and inexpense of lay-up have proven most encouraging. The ability to provide an integrally bonded composite with no accompanying need for studs or repeated caulking assures not only low installation but also low maintenance costs. Further, the composition is relatively light weight which is an important factor particularly in aircraft carrier structure.

The embodiment of the composite laminate illustrated in FIG. 3 differs from the FIG. 1 embodiment only in the manner in which metal panels are applied. Otherwise, the use of first and second courses of plywood panel to form a plywood core may be the same as the FIG. 1 embodiment, as is the manner of bonding the plywood core to steel pan 1 and the bonding of the first and second courses of the core one to the other.

The principal differences between FIG. 3 and FIG. 1 embodiments is the fact that FIG. 3 embodiment employs a third plywood course 16 also formed of plywood panels of substantial length, width and thickness, these panels, however, being mechanically interlocked to metal plates 17 which, in the manner already described, are bonded to the top surface of the panels of this third course. However, because of the use of third course 16, it may be found desirable to reduce the thickness of all the plywood courses to the extent that the previous thicknesses of courses 2 and 3 may be reduced from 1/4" to 1" while third course 16 is of a thickness of 3/4". The metal plates, particularly if aluminum is employed, again are 1/4" in thickness so that the overall thickness of the composite is approximately 3" as compared to 2 3/4" for the overall thickness of the FIG. 1 embodiment.

The mechanical interlocking of metal plates 17 with the panels of third course 16 is achieved by forming the end surfaces of each of which has an inwardly extending flange 18 (FIG. 4) designed to fit beneath the wood panels in the manner shown to provide the interlock. To accommodate flanges 18, each of the plywood panels of the top course is undercut to provide grooves 19. Also, 1/8" spacings 21 and 22 are left between the ends of the wood panel and the hook portion of the metal panels for obvious expansion purposes.

The construction of the FIG. 3 embodiment may be utilized generally, although it is particularly suitable for use on the actual impact area of an aircraft landing zone. Also, because of the anticipated severe impacts, it might be preferred to employ hickory plywood at least for the top or third 3/4" plywood course, the hickory being used because of its hardness and higher strength. The interlock is advantageous in insuring that edges of the metal cannot be caught by aircraft tailhooks. Also its use provides somewhat of a guarantee in the event the adhesive fails at the edges.

The operation of the composite, as well as its advantages should be readily apparent from the foregoing description. As compared to prior teakwood planking, the advantages of cost and strentgh appear unquestionable. Also, although modern aircraft flight decks presently favor all steel or metal construction, the strength and certainly the cost of the present laminate compares favorably. As already noted, one considerable advantage is the fact that a laminate of the foregoing type can be readily substituted for existing teakwood or other plank-type decks, while the all steel construction is not adaptable. It further should be again noted that the flight deck application of the present laminate has been emphasized principally as exemplary of the required characteristics. Other possible applications are in the field of mine sweeper decks, industrial floors, bridge decks, landing strips and floating and submerged platforms.

Other objects and many of the attendant advantages of this invention will be readily appreciated as the same becomes better understood by reference to the following detailed description when considered in connection with the accompanying drawings.

What is claimed is:
1. A composite wear and impact-resistant laminate comprising a plywood core formed of plural courses of adhesively bonded plywood panels, superimposed in a staggered arrangement and a composite metal and plywood facing overlying and adhesively bonded to said core, said composite facing being formed of loosely-interlocked metal and plywood panels of substantially equal length and of a length capable of producing approximately 3/16" end movement of the metal panel when subjected to a temperature change of 100° F., a layer of adhesive material integrally bonding said plywood panels of said facing to said plywood core, and another layer of flexible adhesive material integrally bonding the under face of each metal panel to its interlocked plywood panel, said layer of flexible adhesive being of sufficient thickness for accommodating said end movement without rupture said interlock being provided by end flanges formed on each metal panel, said flanges being spaced from the end portions of the interlocked plywood panels a sufficient distance for accommodating said expansion and said end flanges each having a portion disposed beneath said plywood facing.

2. A composite wear and impact resistant laminate comprising a core formed of plural courses of wood panels superimposed in a staggered arrangement, a metal facing overlying said core and formed of semi-rigid metal panels, a film of adhesive material integrally bonding superimposed wood courses one to the other, a second layer of adhesive material integrally bonding the underlying facing of the core to a support structure, and a third layer of flexibly adhesive material integrally bonding the overlying face of the core to said metal facing, said core and metal panels being substantially equal in length and said metal panels being of sufficient size for producing about 3/16" end movement of the metal when subjected to a temperautre change of about 100° F. either side of an ambient temperature, said flexibly adhesive material being of sufficient thickness for accommodating said end movement without rupture upon differential dimensional variations produced by temperature changes of about 100° F. either side of an ambient temperature, said core being formed of plywood panels and said metal facing being formed of aluminum of substantially no less than 1/8" thickness.

3. A composite wear and impact resistant laminate comprising a core formed of plural courses of wood panels superimposed in a staggered arrangement, a metal facing overlying said core and formed of semi-rigid metal panels, a film of adhesive material integrally bonding superimposed wood courses one to the other, a second layer of adhesive material integrally bonding the underlying facing of the core to a support structure, and a third layer of flexibly adhesive material integrally bonding the overlying face of the core to said metal facing, said core and metal panels being substantially equal in length and said metal panels being of sufficient size for producing about 3/16" end movement of the metal when subjected to a temperature change of about 100° F. either side of an ambient temperature, said flexibly adhesive material being of sufficient thickness for accommodating said end movement without rupture said three adhesive materials being a cured-in-situ substantially 100% reactive liquid synthetic rubber mastic, and said support structure including, a metal layer, and a plurality of spaced supports for said metal layer, said metal layer being bonded to said underlying facing of said core by said second layer of adhesive.

4. The composite of claim 3 wherein said third layer of adhesive material is a polysulfide elastomer.

5. The composite of claim 4 wherein said second layer of adhesive material is formed of a polysulfide elastomer and a microsphere filler.

6. The composite of claim 3 wherein said third layer of flexible material is a polyurethane elastomer.

References Cited by the Examiner

UNITED STATES PATENTS

| | | |
|---|---|---|
| 1,928,902 | 10/1933 | Lewis. |
| 2,107,240 | 2/1938 | Eilersten _____ 52—411 |
| 2,117,085 | 5/1938 | Ensminger _____ 156—278 |
| 2,207,454 | 7/1940 | Brierly _____ 52—404 |
| 2,437,095 | 3/1948 | Kohr _____ 52—622 |
| 2,779,979 | 2/1957 | Sundelin et al. _____ 52—479 |
| 2,806,509 | 9/1957 | Bozzacco _____ 52—309 |
| 2,925,831 | 2/1960 | Welty et al. _____ 52—309 |

OTHER REFERENCES

Engineering Properties and Application of Plastics: by Kinney 1957, pages 158 and 159, published by Wiley and Sons, New York.

Plastics: July 1947; pages 21, 22 and 24.

FRANK L. ABBOTT, *Primary Examiner.*

J. L. NACKENOFF, *Examiner.*

J. E. MURTAGH, *Assistant Examiner.*